(12) United States Patent
Nair

(10) Patent No.: US 12,305,742 B1
(45) Date of Patent: May 20, 2025

(54) GEAR RATTLE MITIGATION ASSEMBLY

(71) Applicant: GM GLOBAL TECHNOLOGY OPERATIONS LLC, Detroit, MI (US)

(72) Inventor: Anuroop Nair, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/660,999

(22) Filed: May 10, 2024

(51) Int. Cl.
*F16H 57/00* (2012.01)

(52) U.S. Cl.
CPC .............................. *F16H 57/0006* (2013.01)

(58) Field of Classification Search
CPC ...... F16H 55/18; F16H 55/14; F16H 57/0006; F16H 57/12
USPC .......................................... 74/450, 444, 445
See application file for complete search history.

(56) References Cited

U.S. PATENT DOCUMENTS

| | | | |
|---|---|---|---|
| 1,518,360 A * | 12/1924 | Royce | F01L 1/026 192/55.61 |
| 1,558,222 A * | 10/1925 | Beetow | F16H 55/18 74/440 |
| 4,519,264 A * | 5/1985 | Inui | F16H 55/18 74/440 |
| 5,146,804 A * | 9/1992 | Carmillet | F16H 57/0006 74/411 |
| 6,131,477 A * | 10/2000 | Gaydek | F16D 3/68 74/411 |
| 6,161,512 A * | 12/2000 | Beels Van Heemstede | F16F 15/129 123/90.31 |
| 10,001,204 B2 * | 6/2018 | Mitsubori | F16H 57/0006 |

FOREIGN PATENT DOCUMENTS

| | | |
|---|---|---|
| CN | 104763795 A | 7/2015 |
| DE | 10058885 A1 | 6/2001 |
| DE | 102019103112 A1 | 8/2019 |
| WO | 2021058054 A1 | 4/2021 |

* cited by examiner

*Primary Examiner* — Jake Cook
(74) *Attorney, Agent, or Firm* — Quinn IP Law

(57) ABSTRACT

A gear rattle mitigation assembly includes a rotatable shaft and a gear element mounted to the rotatable shaft. The gear element includes a primary mass rotatably fixed to the rotatable shaft and a secondary mass operatively connected to the primary mass. The gear element also includes a resilient member arranged between the secondary mass and the primary mass and configured to absorb variation in torque applied to the secondary mass and mitigate gear rattle when the gear element is in mesh with another gear. A gear-train assembly employing the gear rattle mitigation assembly and a motor vehicle having such a gear-train assembly are also included.

16 Claims, 4 Drawing Sheets

GEAR RATTLE MITIGATION ASSEMBLY

INTRODUCTION

The disclosure relates to a gear rattle mitigation assembly for a torque transmitting gear-train.

A gear-train is a mechanical system formed by mounting a plurality of gears on a frame so that teeth of the gears engage, generally to transmit rotation and torque. Gear teeth are generally designed to ensure that the pitch circles of engaging gears roll on each other without slipping, thereby providing a smooth transmission of motion from one gear to the next. The ratio of the pitch circles of mating gears defines the speed ratio and the mechanical advantage of the gear set. The simplest example of a gear-train has two gears. The input gear, also known as the drive gear, transmits power to the output gear, also known as the driven gear. The drive gear will typically be connected to a power source, such as an electric motor or an internal combustion engine. In such an example, the torque or force output of the driven gear depends on the dimensional ratio of the two mating gears.

Gear or gear-mesh rattle is an acoustic disturbance generated by a gear-train as a result of dynamic behavior of constituent gears. Generally, gear rattle is a result of an excitation force, such as angular speed fluctuations imparted to the input gear or an external input force applied to the frame that mounts the gear-train, and profile errors of the gear teeth. Tooth profile errors typically result from the underlying gear manufacturing process and are difficult to eliminate in mass production. The tooth profile errors frequently result in increased gear lash, which can lead to repeated impacts and rebounds of meshed gear teeth. Typically, gear rattle is generated by the repeated impacts and rebounds of the meshed gear teeth and is especially common in unloaded or lightly loaded gears. Gear rattle may be affected, either positively or negatively by the bearings that support the gears and respective gear lubrication conditions.

SUMMARY

In one aspect, a gear rattle mitigation assembly includes a rotatable shaft and a gear element mounted to the rotatable shaft. The gear element includes a primary mass rotatably fixed to the rotatable shaft and a secondary mass operatively connected to the primary mass. The gear element also includes a resilient member arranged between the secondary mass and the primary mass and configured to absorb variation in torque applied to the secondary mass and mitigate gear rattle when the gear element is in mesh with another gear.

In another aspect, a gear-train assembly includes such a gear rattle mitigation assembly as a subassembly thereof. The gear-train assembly includes a rotatable first shaft arranged along a first axis and configured to receive an input torque and a rotatable second shaft arranged along a second axis and configured to transmit a gear-train output torque. A first gear element is mounted to the rotatable first shaft and a second gear element is in mesh with the first gear element and mounted to the rotatable second shaft. The first gear element mounted to the rotatable first shaft is configured to receive an input torque and structured as the subject gear rattle mitigation assembly.

The secondary mass may include a plurality of pockets and the primary mass may include a plurality of lugs configured to extend into corresponding pockets.

Each pocket may be defined by a first wall and a second wall. Each lug may have a first side facing the first wall of the pocket and a second side facing the second wall of the pocket. Additionally, the resilient member may include a plurality of spring elements having a first spring element and a second spring element arranged in each pocket. In such an embodiment, the first spring element may be arranged between the first side of the respective lug and the first wall of the corresponding pocket, while the second spring element may be arranged between the second side of the respective lug and the second wall of the corresponding pocket.

The gear-train assembly may additionally include a retaining element configured to maintain connection between the primary mass and the secondary mass and retain the first and second spring elements in the corresponding pockets.

The retaining element may be a snap-ring.

The rotatable first shaft may define a circumferential groove. In such an embodiment, the snap-ring may be seated inside the groove and configured to keep the secondary mass from shifting along the rotatable first shaft.

The secondary mass may include a plurality of gear teeth.

The secondary mass gear teeth may be defined by a helix angle configured to direct axial forces away from the snap-ring.

The primary mass may be rotatably fixed to the rotatable first shaft.

The secondary mass may have an inside diameter greater than an outside diameter of the rotatable first shaft, thus generating a rotational clearance between the two components.

A power-source in a motor vehicle may supply torque to such a geartrain assembly.

The above features and advantages, and other features and advantages of the present disclosure, will be readily apparent from the following detailed description of the embodiment(s) and best mode(s) for carrying out the described disclosure when taken in connection with the accompanying drawings and appended claims.

Figure 1:
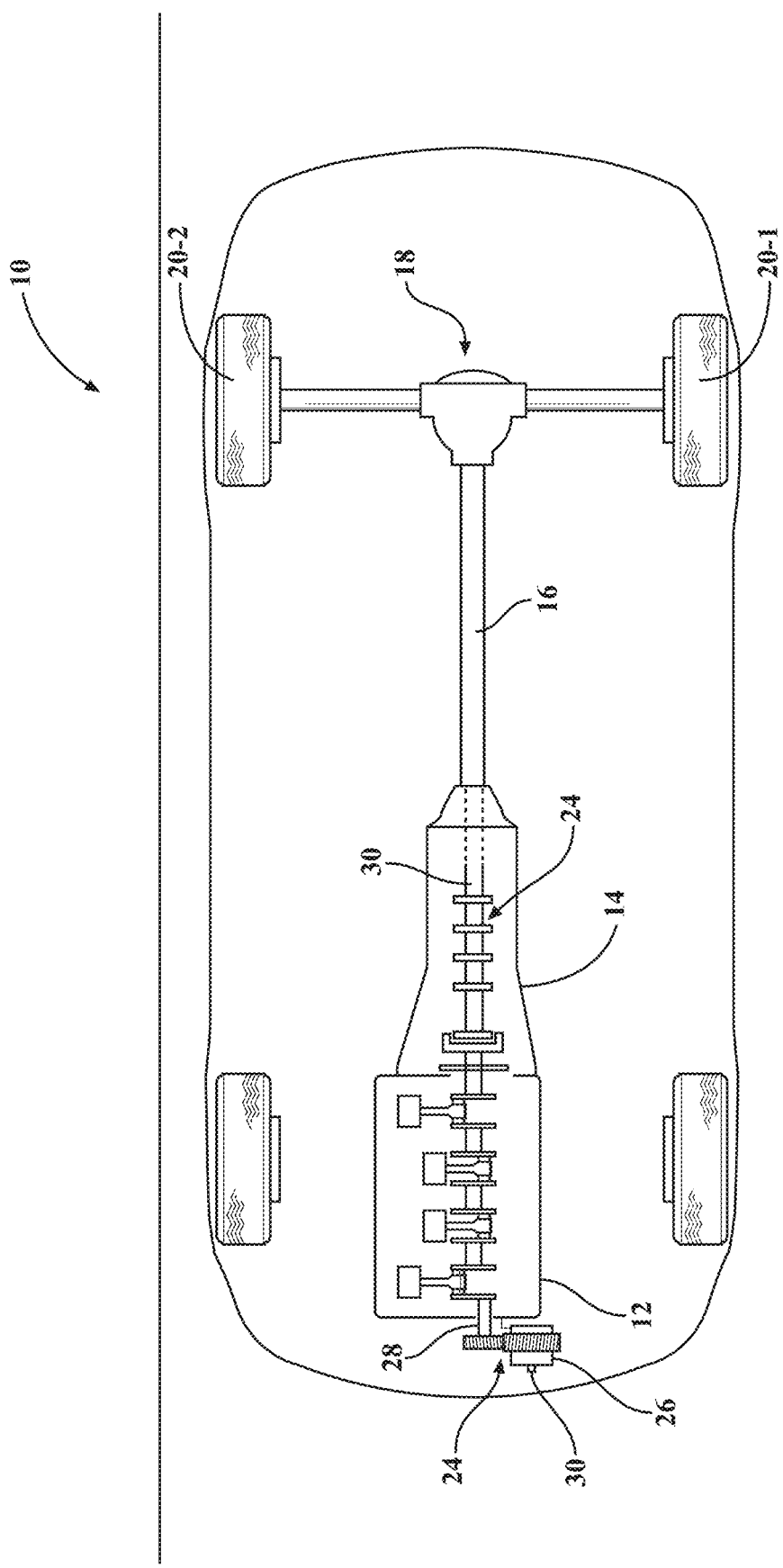
FIG. 1 is a schematic illustration of a motor vehicle employing a powertrain having a power-source coupled to drive wheels via a transmission assembly and operatively connected to an accessory unit, according to the disclosure.

2 and 4, depicting a snap-ring seated inside a groove of the input shaft, according to the disclosure.

DETAILED DESCRIPTION

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion. Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims.

Referring to the drawings in which like elements are identified with identical numerals throughout, FIG. 1 illustrates a wheeled motor vehicle 10. The vehicle 10 is generally arranged along a longitudinal vehicle axis and includes powertrain and passenger compartments. As shown, the powertrain of vehicle 10 includes at least one power-source 12 configured to generate power-source input or drive torque $T_i$. As shown, the power-source 12 may be coupled to a transmission assembly 14, and operatively connected, via a drive shaft 16, to a drive-axle 18. The drive-axle 18 is in turn operatively connected to respective left- and right-side road wheels 20-1, 20-2 configured to provide vehicle propulsion. Although a single power-source 12 and a single drive-axle 18 are shown, nothing precludes the vehicle 10 from employing a combination of power-sources and multiple drive-axles for propulsion thereof. For example, the power-sources 12 may include an internal combustion engine as well as an electric motor-generator to power the vehicle 10. The specific road wheels 20-1, 20-2 receiving the input drive torque $T_i$ from the power-source 12 to power the vehicle 10 down a road surface may be defined as "drive" wheels.

Figure 2:
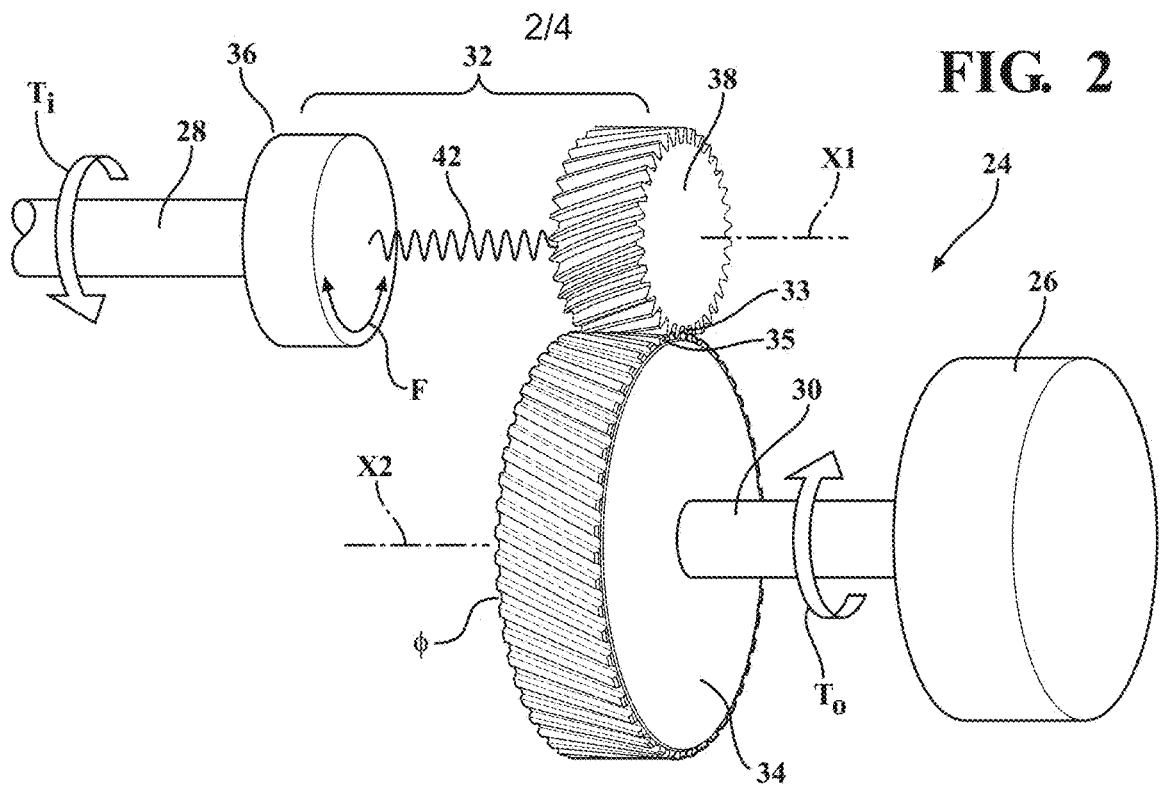
FIG. 2 is a schematic perspective view of a gear-train assembly employed for transmitting torque, such as to the drive wheels or to the accessory unit shown in FIG. 1, depicting meshed first and second gear elements with the first gear element configured as a split inertia gear rattle mitigation assembly having a primary mass, a secondary mass, and a resilient member arranged therebetween, according to the disclosure.

As shown schematically in FIG. 2, vehicle 10 also includes a gear-train assembly 24 having a plurality of intermeshed gears that establish a speed ratio and a mechanical advantage in transmitting the input torque $T_i$ from the power-source 12 to drive a load. The subject load may be mass of the vehicle 10 or an accessory unit 26, such as an alternator or an oil pump. A torque input to the gear-train assembly 24 may be applied in an uneven or variable manner. For example, in a vehicle 10 where the power-source 12 includes an internal combustion engine, the input torque $T_i$ has a generally sinusoidal character. Where the internal combustion engine is configured as a compression ignition or diesel powerplant, the input torque $T_i$ may exhibit significant amplitude or peak to bottom variation.

Typically, intermeshed gears exhibit tooth-to-tooth variation and profile tooth errors because of the manufacturing process and tooling used to make the gears. The tooth profile variations and errors of the intermeshed gears frequently result in increased meshed tooth clearance or gear lash in the gear-train. Variation in input torque $T_i$ typically results in angular speed fluctuations generating an excitation force F, which, channeled into the gear-train, causes high bi-directional acceleration of intermeshed gears. Such bi-directional acceleration of intermeshed gears may lead to repeated impacts and rebounds of meshed gear teeth across the gear lash, resulting in an acoustic disturbance known as gear rattle. Gear rattle in the gear-train assembly 24 is, therefore, a dynamic response of intermeshed gears, which generally varies with magnitude of the excitation force F.

With resumed reference to FIG. 2, the gear-train assembly 24 includes a rotatable first or input shaft 28 arranged along a first axis X1 and configured to receive the input power-source torque $T_i$. The first shaft 28 may be a crankshaft of the internal combustion engine. As shown, the gear-train assembly 24 also includes a rotatable second or output shaft 30 arranged along a second, parallel axis X2. A first gear element 32 having a plurality of gear teeth 33, shown schematically in FIG. 2, is mounted to the first shaft 28. The first gear element 32 may be considered a "drive gear" as the gear to initially receive and transmit the input power-source torque $T_i$. A second gear element 34 having a plurality of gear teeth 35, also shown schematically in FIG. 2, is mounted to the second shaft 30 and is in mesh with the first gear element 32. The second shaft 30 is configured to transmit a gear-train output torque $T_o$ achieved via the ratio of the first gear element 32 to the second gear element 34 to drive the accessory unit 26 load. Accordingly, the second gear element 34 may be considered a "driven gear" in the gear-train assembly 24.

The first gear element 32 mounted to the rotatable first shaft 28 is additionally configured to operate as a split inertia gear rattle mitigation assembly. The first gear element 32 is constructed to absorb the excitation force F by splitting the subject gear into individual but operatively connected masses or inertias. As shown in FIG. 2, the first gear element 32 includes a primary mass 36 structured as an inner ring-shaped component having a first inertia and connected to the rotatable first shaft 28. The first gear element 32 also includes a secondary mass 38 shown as an outer ring-shaped component having a second inertia and fit together with and operatively connected to the primary mass 36. As shown, the secondary mass 38 includes the gear teeth 33 configured to mesh with the gear teeth 35 of the second gear element 34. The gear teeth 33 and the gear teeth 35 may have a helical profile. Each of the primary and secondary masses 36, 38 may be constructed or formed, e.g., cast and/or machined, from metal, such as carbon or alloy steel.

Figure 3:
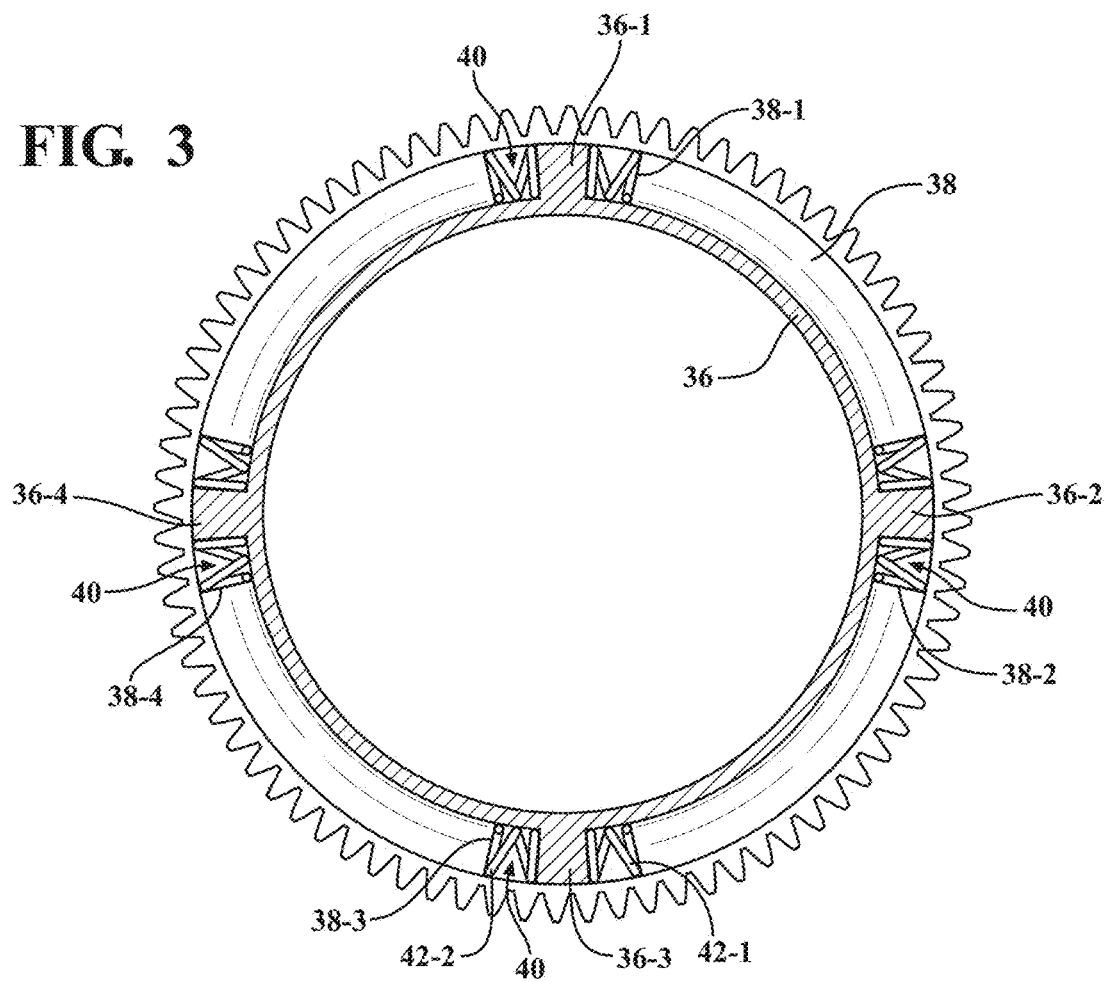
FIG. 3 is a schematic close-up cross-sectional front view of the rattle mitigation assembly shown in FIG. 2, depicting lugs of the primary mass and resilient member spring elements positioned inside pockets of the secondary mass, according to the disclosure.
Figure 4:
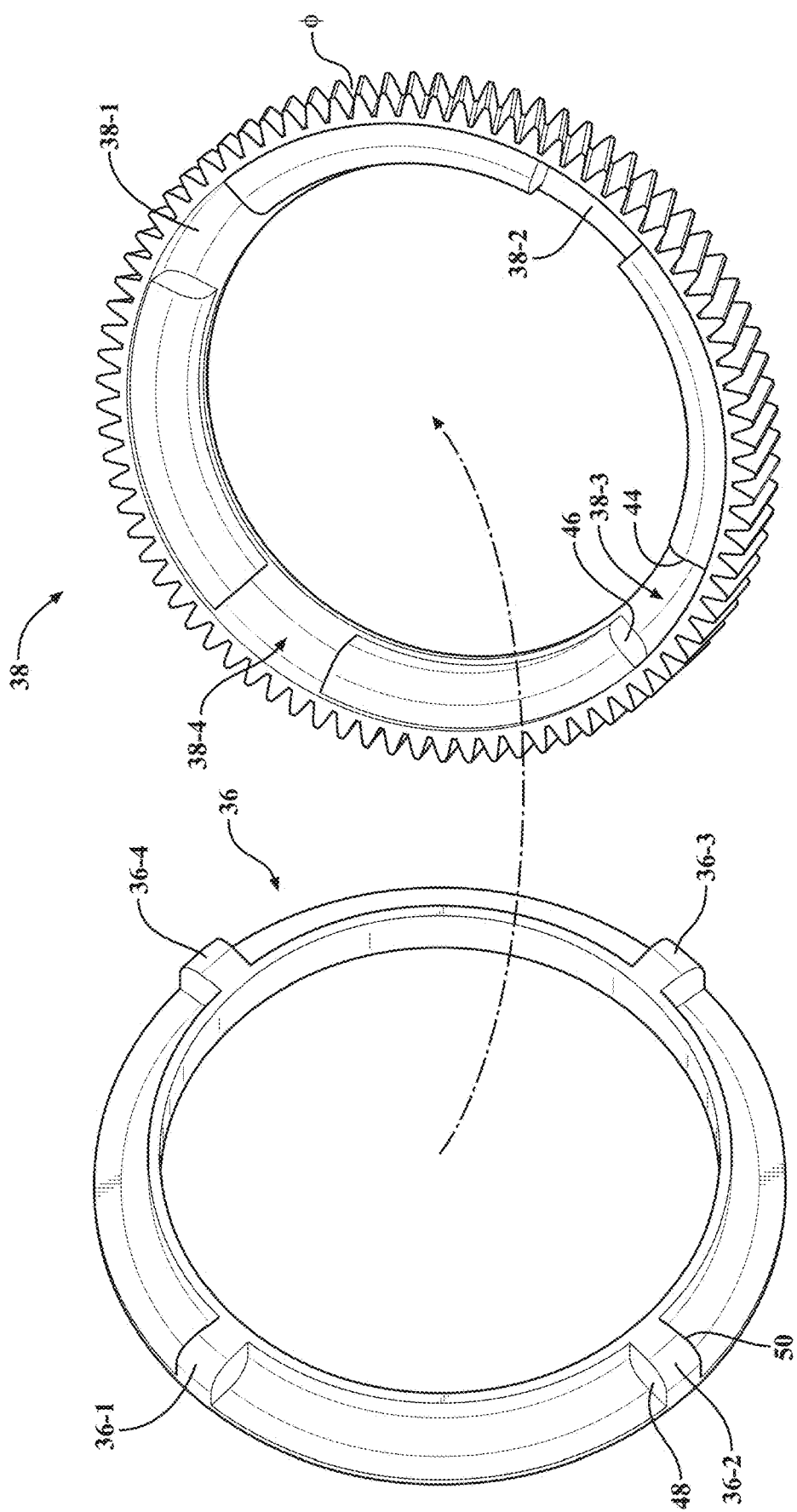
FIG. 4 is a schematic close-up perspective view of the first gear element, shown in FIG. 3, depicting the primary and secondary masses in a disassembled state to show specific features of the subject masses, according to the disclosure.

As shown in FIGS. 3 and 4, the primary mass 36 may include a plurality of lugs, shown as four individual lugs 36-1, 36-2, 36-3, and 36-4. The secondary mass 38 may include a plurality of pockets, shown as four individual pockets 38-1, 38-2, 38-3, and 38-4. When the secondary mass 38 is assembled with the primary mass 36, the lugs 36-1, 36-2, 36-3, 36-4 extend into the corresponding pockets 38-1, 38-2, 38-3, 38-4 with space 40 remaining for the lugs to shift within the pockets. Although four individual lugs 36-1, 36-2, 36-3, 36-4 and four individual pockets 38-1, 38-2, 38-3, 38-4 are shown, nothing prevents the gear rattle mitigation assembly from having fewer or greater number of such mating lugs and pockets.

With resumed reference to FIG. 2, the gear rattle mitigation assembly additionally includes a resilient member 42 arranged between the secondary mass 38 and the primary mass 36 and configured to operatively decouple the first and second inertias. The resilient member 42 may include a plurality of spring elements installed into the spaces 40 within the corresponding pockets 38-1, 38-2, 38-3, 38-4 (shown in FIG. 3). In the present embodiment of the gear rattle mitigation assembly, the resilient member 42 includes a total of eight spring elements, with a first spring element 42-1 and a second spring element 42-2 arranged in each pocket 38-1, 38-2, 38-3, 38-4. The spring elements 42-1, 42-2 are configured to substantially absorb variation in torque applied to the secondary mass, e.g., the input torque $T_i$ and mitigate gear rattle generated by the meshing of first and second gear elements 32, 34. Specifically, the gear rattle is mitigated by attenuating the excitation force F otherwise transmitted across the gear tooth clearance between first and second gear elements 32, 34 via decoupling of the first and second inertias.

As shown in FIG. 4, each pocket 38-1, 38-2, 38-3, 38-4 is defined by a right and a left wall, identified as a first wall 44 and an opposing second wall 46. Also, each lug 36-1, 36-2, 36-3, 36-4 has a right and a left side, identified as a first side 48 facing the first wall 44 of the respective pocket and a second side 50 facing the second wall 46 of the same pocket. Referencing the images of FIGS. 3 and 4, in each pocket 38-1, 38-2, 38-3, 38-4, the first spring element 42-1 is arranged between the first side 48 of the respective lug 36-1, 36-2, 36-3, 36-4 and the first wall 44 of the corresponding pocket. Likewise in each pocket 38-1, 38-2, 38-3, 38-4, the second spring element 42-2 is arranged between the second side 50 of the respective lug 36-1, 36-2, 36-3, 36-4 and the second wall 46 of the corresponding pocket. As a result, the individual spring elements 42-1, 42-2 are arranged in respective pockets and act on the corresponding lugs therein.

Figure 5:
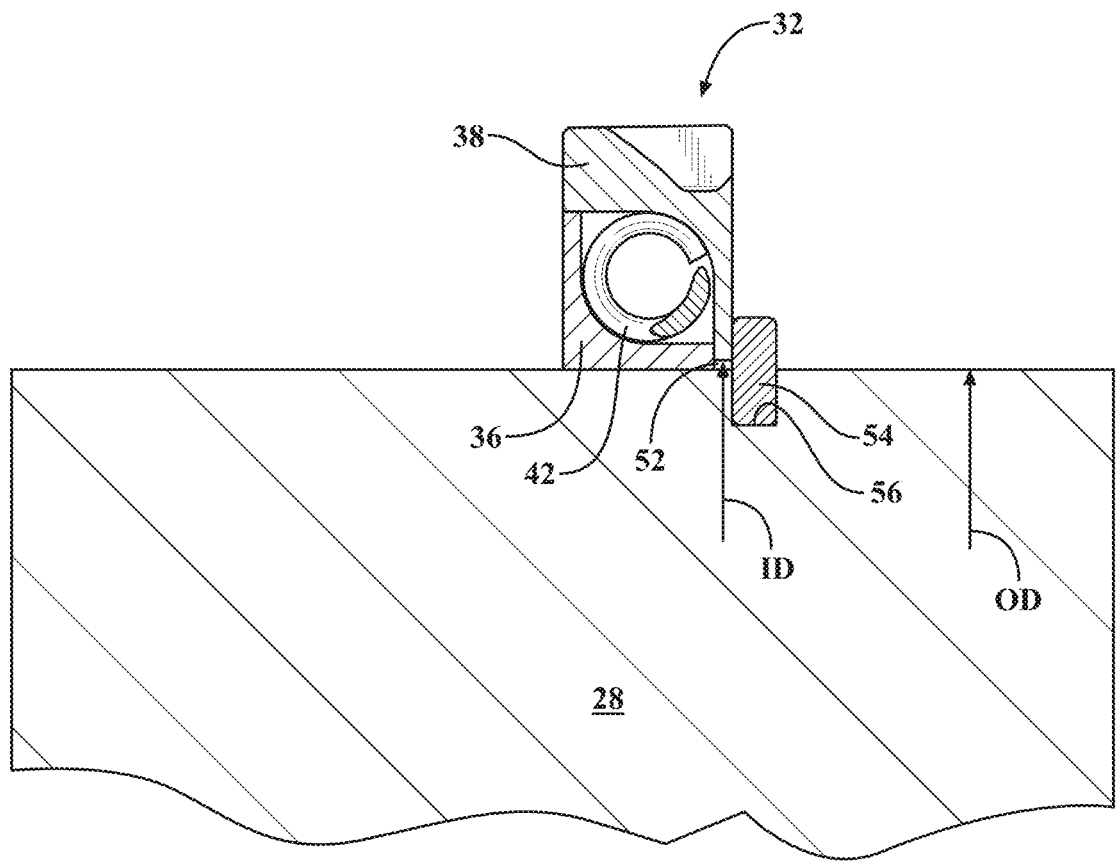
FIG. 5 is a schematic close-up partial cross-sectional side view of the gear rattle mitigation assembly shown in FIGS.

As shown in FIG. 5, the primary mass 36 is rotatably fixed to, e.g., press-fit onto the rotatable first shaft 28. On the other hand, the secondary mass 38 has an inside diameter (ID) greater than an outside diameter (OD) of the rotatable first shaft 28, resulting in a rotational clearance 52 therebetween. The rotational clearance 52 permits the secondary mass 38 to shift relative to the primary mass 36, compressing the respective spring elements within the spaces 40, thereby absorbing the variation in input torque $T_i$ transmitted across the lash in the meshed first and second gear elements 32, 34. The gear rattle mitigation assembly may additionally include a retaining element 54. The retaining element 54 is configured fix the secondary mass 38 relative to the first shaft 28 and maintain connection between the primary mass 36 and the secondary mass 38. The retaining element 54 also serves to retain the resilient member 42 inside the gear rattle mitigation assembly (first and second spring elements 42-1, 42-2 in corresponding pockets 38-1, 38-2, 38-3, 38-4).

The retaining element 54 may be a shoulder (not shown) incorporated into the rotatable shaft 28 or a separate component such as a snap-ring (shown in FIG. 5) installed for the subject purpose. The rotatable first shaft 28 may define a circumferential groove 56. The snap-ring retaining element 54 may be seated inside the groove 56 and configured to keep the secondary mass 38 from shifting along the subject rotatable shaft and separating axially from the primary mass 36. The secondary mass gear teeth 33 may be defined by a helix angle θ (shown in FIGS. 2 and 4) configured to direct axial forces (i.e., component of the excitation force F directed along the first axis X1) away from (e.g., direction opposite to) the snap-ring retaining element 54. The helix angle θ thereby facilitates reliable retention of the snap-ring 54 on the rotatable first shaft 28 during transmission and under variation of the input torque $T_i$.

Overall, the gear rattle mitigation assembly is employed to absorb variation in input torque in a gear-train, which may otherwise lead to an acoustic disturbance resulting from repeated impacts and rebounds of meshed gear teeth. The gear rattle mitigation assembly includes a dual-mass gear element mounted to the rotatable shaft receiving the input torque. A resilient member, such as multiple individual spring elements, is arranged between the masses of the gear element to absorb the variation in input torque and attenuate the excitation force that generates the impacts and rebounds of meshed gear teeth. The dual-mass gear element may include lugs of one mass positioned in pockets of the other mass with spring elements arranged in the pockets and acting on the lugs. A retaining element, such as a snap-ring, may be used to keep the rattle mitigation assembly together inside the gear-train.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework and the scope of the appended claims.

What is claimed is:

1. A gear-train assembly comprising:
    a rotatable first shaft arranged along a first axis and configured to receive an input torque;
    a rotatable second shaft arranged along a second axis and configured to transmit a gear-train output torque;
    a first gear element mounted to the rotatable first shaft; and
    a second gear element in mesh with the first gear element and mounted to the rotatable second shaft;
    wherein the first gear element is structured as a gear rattle mitigation assembly and includes:
        a primary mass connected to the rotatable first shaft;
        a secondary mass operatively connected to the primary mass includes a plurality of pockets; and
        a resilient member arranged between the secondary mass and the primary mass and configured to absorb variation in torque applied to the secondary mass and mitigate gear rattle generated by the meshing of the first and second gear elements;
    wherein:
        the secondary mass includes a plurality of pockets and the primary mass includes a plurality of lugs configured to extend into corresponding pockets;
        each pocket is defined by a first wall and a second wall;

each lug has a first side facing the first wall of the pocket and a second side facing the second wall of the pocket;

the resilient member includes a plurality of spring elements having a first spring element and a second spring element arranged in each pocket;

the first spring element is arranged between the first side of the respective lug and the first wall of the corresponding pocket; and the second spring element is arranged between the second side of the respective lug and the second wall of the corresponding pocket.

2. The gear-train assembly according to claim 1, wherein the gear-train assembly additionally includes a retaining element configured to maintain connection between the primary mass and the secondary mass and retain the first and second spring elements in the corresponding pockets.

3. The gear-train assembly according to claim 2, wherein the retaining element is a snap-ring.

4. The gear-train assembly according to claim 3, wherein the rotatable first shaft defines a circumferential groove, and wherein the snap-ring is seated inside the groove and configured to keep the secondary mass from shifting along the rotatable first shaft.

5. The gear-train assembly according to claim 4, wherein the secondary mass includes a plurality of gear teeth.

6. The gear-train assembly according to claim 5, wherein the secondary mass gear teeth are defined by a helix angle configured to direct axial forces away from the snap-ring.

7. The gear-train assembly according to claim 1, wherein the primary mass is rotatably fixed to the rotatable first shaft.

8. The gear-train assembly according to claim 1, wherein the secondary mass has an inside diameter greater than an outside diameter of the rotatable first shaft.

9. A gear rattle mitigation assembly comprising:
a rotatable shaft; and
a gear element mounted to the rotatable shaft and including:
a primary mass rotatably fixed to the rotatable shaft;
a secondary mass operatively connected to the primary mass; and
a resilient member arranged between the secondary mass and the primary mass and configured to absorb variation in torque applied to the secondary mass and mitigate gear rattle when the gear element is in mesh with another gear,
wherein:
the secondary mass includes a plurality of pockets and the primary mass includes a plurality of lugs configured to extend into corresponding pockets;
each pocket is defined by a first wall and a second wall;
each lug has a first side facing the first wall of the pocket and a second side facing the second wall of the pocket;
the resilient member includes a plurality of spring elements having a first spring element and a second spring element arranged in each pocket;
the first spring element is arranged between the first side of the respective lug and the first wall of the corresponding pocket; and
the second spring element is arranged between the second side of the respective lug and the second wall of the corresponding pocket.

10. The gear rattle mitigation assembly according to claim 9, further comprising a retaining element configured to maintain connection between the primary mass and the secondary mass and retain the first and second spring elements in the corresponding pockets.

11. The gear rattle mitigation assembly according to claim 10, wherein the retaining element is a snap-ring.

12. The gear rattle mitigation assembly according to claim 11, wherein the rotatable shaft defines a circumferential groove, and wherein the snap-ring is seated inside the groove and configured to keep the secondary mass from shifting along the rotatable shaft.

13. The gear rattle mitigation assembly according to claim 12, wherein the secondary mass includes a plurality of gear teeth.

14. The gear rattle mitigation assembly according to claim 13, wherein the secondary mass gear teeth are defined by a helix angle configured to direct axial forces away from the snap-ring.

15. The gear rattle mitigation assembly according to claim 9, wherein the secondary mass has an inside diameter greater than an outside diameter of the rotatable shaft.

16. A motor vehicle comprising:
a power-source configured to generate power-source torque; and
a gear-train assembly configured to transmit the power-source torque to drive a load, the gear-train assembly including:
a rotatable first shaft arranged along a first axis and configured to receive the power-source torque;
a rotatable second shaft arranged along a second axis and configured to transmit a gear-train output torque and drive the load;
a first gear element mounted to the rotatable first shaft; and
a second gear element in mesh with the first gear element and mounted to the rotatable second shaft;
wherein the first gear element includes:
a primary mass connected to the rotatable first shaft;
a secondary mass operatively connected to the primary mass; and
a resilient member arranged between the secondary mass and the primary mass and configured to absorb variation in torque applied to the secondary mass and mitigate gear rattle generated by the meshing of the first and second gear elements;
wherein:
the secondary mass includes a plurality of pockets and the primary mass includes a plurality of lugs configured to extend into corresponding pockets;
each pocket is defined by a first wall and a second wall;
each lug has a first side facing the first wall of the pocket and a second side facing the second wall of the pocket;
the resilient member includes a plurality of spring elements having a first spring element and a second spring element arranged in each pocket;
the first spring element is arranged between the first side of the respective lug and the first wall of the corresponding pocket; and
the second spring element is arranged between the second side of the respective lug and the second wall of the corresponding pocket.

* * * * *